(12) United States Patent
Jiang et al.

(10) Patent No.: US 11,256,830 B2
(45) Date of Patent: Feb. 22, 2022

(54) APPARATUS FOR ADDING PROTECTION FUNCTION FOR INDIRECT ACCESS MEMORY CONTROLLER

(71) Applicant: C-SKY Microsystems Co., Ltd., Zhejiang (CN)

(72) Inventors: Peng Jiang, Hangzhou (CN); Jun Yang, Hangzhou (CN); Shu Bao, Hangzhou (CN); Jiaqi Xi, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 240 days.

(21) Appl. No.: 16/479,521

(22) PCT Filed: Nov. 12, 2018

(86) PCT No.: PCT/CN2018/115005
§ 371 (c)(1),
(2) Date: Jul. 19, 2019

(87) PCT Pub. No.: WO2019/114477
PCT Pub. Date: Jun. 20, 2019

(65) Prior Publication Data
US 2019/0384937 A1    Dec. 19, 2019

(30) Foreign Application Priority Data
Dec. 15, 2017    (CN) .......................... 201711344551.X

(51) Int. Cl.
*G06F 12/14*    (2006.01)
*G06F 21/78*    (2013.01)
(Continued)

(52) U.S. Cl.
CPC .......... *G06F 21/78* (2013.01); *G06F 15/7807* (2013.01)

(58) Field of Classification Search
None
See application file for complete search history.

(56) References Cited

U.S. PATENT DOCUMENTS

| | | | |
|---|---|---|---|
| 7,055,038 B2 | 5/2006 | Porter et al. | |
| 7,263,565 B2 * | 8/2007 | Tawara ................. | G06F 13/404 361/679.55 |

(Continued)

FOREIGN PATENT DOCUMENTS

| | | |
|---|---|---|
| CN | 101226508 A | 7/2008 |
| CN | 102200952 A | 9/2011 |

(Continued)

OTHER PUBLICATIONS

Mondrix: Memory Isolation for Linux using Mondriaan Memory Protection. Witchel. ACM. (Year: 2005).*

(Continued)

*Primary Examiner* — Venkat Perungavoor
(74) *Attorney, Agent, or Firm* — Finnegan, Henderson, Farabow, Garrett & Dunner, LLP

(57) ABSTRACT

Embodiments of the disclosure provide an apparatus for adding a protection function for an indirect access memory controller. The apparatus can include: a bus monitoring unit configured to monitor a bus address, perform permission authentication if a register controlling operation is detected, and configure a list entry if a permission list configuring operation is detected; an permission list unit configured to partition a memory space into several virtual memory protection areas and independently set an access permission attribute (i.e.: readable, writable, erasable, etc.) of each memory area; a window register information bus configured to provide window register information, i.e., transmit window register information in the memory controller to the protective apparatus, wherein the window register information includes a read window address, a write window (Continued)

address, and an erase window address, and multiple window addresses can correspond to the same bus window register; and an unauthorized operation processing unit configured to process a subsequent operation performed when a permission violating access occurs. The present disclosure can add a memory protection function by merely making simple modifications, thereby achieving an objective of memory protection.

11 Claims, 3 Drawing Sheets

(51) Int. Cl.
    *G06F 15/78*     (2006.01)
    *G06F 12/16*     (2006.01)

(56) References Cited

U.S. PATENT DOCUMENTS

| | | | | |
|---|---|---|---|---|
| 7,725,558 | B2* | 5/2010 | Dickenson | G06F 21/78 709/215 |
| 10,372,630 | B2* | 8/2019 | Hellwig | G06F 12/14 |
| 2006/0080485 | A1* | 4/2006 | Tawara | G06F 13/404 710/110 |
| 2012/0079590 | A1 | 3/2012 | Sastry et al. | |
| 2016/0087986 | A1 | 3/2016 | Gupta et al. | |
| 2016/0147672 | A1* | 5/2016 | Atzmon | G06F 12/1441 711/163 |
| 2017/0185345 | A1* | 6/2017 | Lim | G06F 3/0637 |

FOREIGN PATENT DOCUMENTS

| | | |
|---|---|---|
| CN | 202102449 | 1/2012 |
| CN | 102567245 A | 7/2012 |
| CN | 102592083 | 7/2012 |
| CN | 106326130 | 1/2017 |
| CN | 106383790 A | 2/2017 |
| CN | 108062486 A | 5/2018 |
| CN | 108197503 A | 6/2018 |
| WO | WO2017/028642 | 2/2017 |

OTHER PUBLICATIONS

Security in Software Defined Networks: A Survey. Ahmad. IEEE. (Year: 2015).*
A Design of Egress NAC using an Authentication Visa Checking mechanism to Protect against MAC Address Spoofing Attacks. Puangpronpitag. ECTI. (Year: 2011).*
Towards decentralized system-level security for MPSoC-based embedded applications. Tan. Elsevier. (Year: 2017).*
Towards a Secure Controller Platform for OpenFlow Applications. Wen. ACM. (Year: 2013).*
Extended European Search Report in European Application No. 18888597.4, dated Nov. 18, 2020 (9 pgs).
International Search Report issued in related International Application No. PCT/CN2018/115005, dated Feb. 19, 2019 (3 pgs ).
Chinese Search Report issued by Chinese Patent Office corresponding to Chinese Application No. 201711344551 dated Sep. 19, 2019. (1 page).

* cited by examiner

APPARATUS FOR ADDING PROTECTION FUNCTION FOR INDIRECT ACCESS MEMORY CONTROLLER

CROSS-REFERENCE TO RELATED APPLICATIONS

This application is a national stage filing under 35 U.S.C. § 371 of International Application No. PCT/CN2018/115005, filed on Nov. 12, 2018, and published as WO 2019/114477 A1, which claims the benefits of priority to Chinese application number 201711344551.X, filed Dec. 15, 2017, both of which are incorporated herein by reference in their entireties.

BACKGROUND

Along with the rapid development of mobile Internet and Internet of Things, chip security has become increasingly important. For example, it is important to protect key data and resources in a chip. The protection can be classified into interruption protection, peripheral protection, memory protection, etc., of which memory protection is an extremely important part. The memory protection generally involves assigning different access permissions (e.g., readable, writable or erasable) to different address ranges, and a visitor in a privileged state can restrict an access range and an access permissions of a visitor in a non-privileged state. Through such classification, sensitive data is stored in an area that is only accessible to users in a privileged state and access permissions of users in a non-privileged state are restricted, thereby achieving memory protection.

There have been many protection apparatuses for direct access memories, such as a protection apparatus for a RAM. This type of protection unit only needs to authenticate the address on the bus (which also acts as an access address of a memory unit) to prevent unauthorized access. Some other memories, however, have relatively slow access speeds, and, therefore, controllers of these memories do not support direct access. Under these circumstances, the memories cannot be directly accessed using a bus address; instead, it is necessary to store an access target address into a specified address window register in the controller and then configure a corresponding operation register (e.g., read, write, erase, etc.) in the controller in order to trigger the memory controller to access the memory, e.g., some low-speed flash controllers, E2PROM controllers, indirect access DDR controllers, etc.

SUMMARY OF THE DISCLOSURE

Embodiments of the present disclosure provide an apparatus for adding a protection function for an indirect access memory controller that can add the memory protection function by merely making simple modifications. The apparatus can include: a bus monitoring unit configured to monitor a bus address, perform permission authentication, and configure a permission list entry; a permission list unit configured to partition a memory space and independently set an access permission attribute (i.e., readable, writable or erasable) of each memory area; a window register information bus configured to transmit window register information; and an unauthorized operation processing unit configured to process a subsequent operation performed when a permission violating access occurs.

BRIEF DESCRIPTION OF THE DRAWINGS

To illustrate the technical solutions in the disclosed embodiments more clearly, the accompanying drawings describe the embodiments in the following. It is apparent that the accompanying drawings in the following description are only some embodiments of the present disclosure. Those of ordinary skill in the art can obtain other features according to the accompanying drawings without creative efforts.

DETAILED DESCRIPTION

To make the objectives, technical solutions, and advantages of the embodiments of the present disclosure clearer, the technical solutions in the embodiments of the present disclosure are described clearly and completely in the following with reference to the accompanying drawings in the embodiments of the present disclosure. Apparently, the described embodiments are merely some, rather than all, of the embodiments of the present disclosure. Based on the embodiments in the present disclosure, all other embodiments obtained by those of ordinary skill in the art without creative efforts should belong to the protective scope of the present disclosure.

As indicated above, there is a need for protecting indirect access memories. Creating a new memory controller with the desired protection function would increase the workload and extend the chip development cycle. As the chip security becomes increasingly important, there emerges a huge demand for upgrading security functions of common chips and finding ways to accelerate the security upgrading process. To overcome the deficiency of low security of an existing indirect memory controller, the present disclosure provides an apparatus for adding a protection function for an indirect access memory controller, thereby achieving memory protection.

Figure 1:
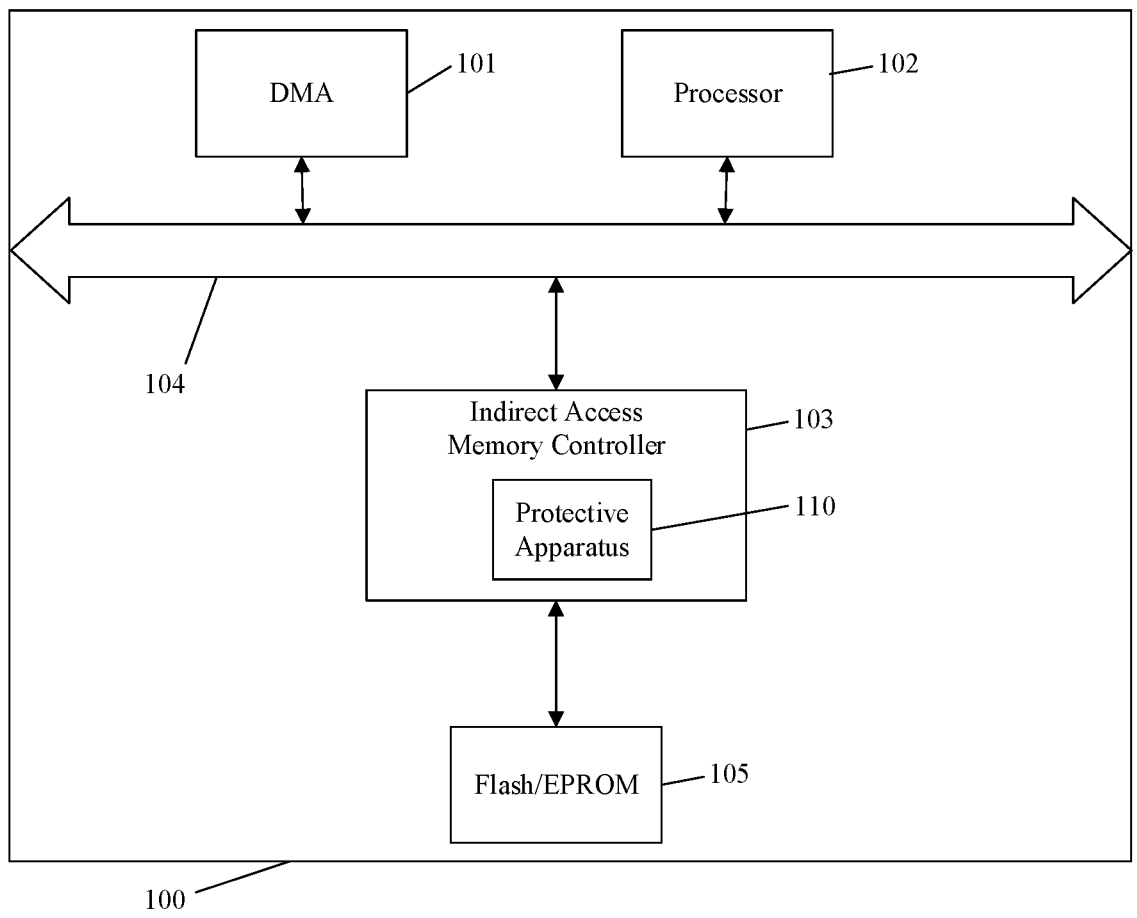
FIG. 1 is a schematic diagram of an exemplary location of a protective apparatus in a SOC chip system, according to some embodiments of the present disclosure.

Some embodiments of the present disclosure provide a protective apparatus for adding a protection function for an indirect access memory controller. FIG. 1 is a schematic diagram of a location of the protective apparatus in an SOC chip system 100, according to some embodiments. As shown in FIG. 1, SOC chip system 100 can include direct memory access (DMA) 101, processor 102, and indirect access memory controller 103, all of which are connected via a bus 104. In the embodiments of the present disclosure, indirect access memory can use protective apparatus 110 when attempting to access memory 105.

Figure 2:
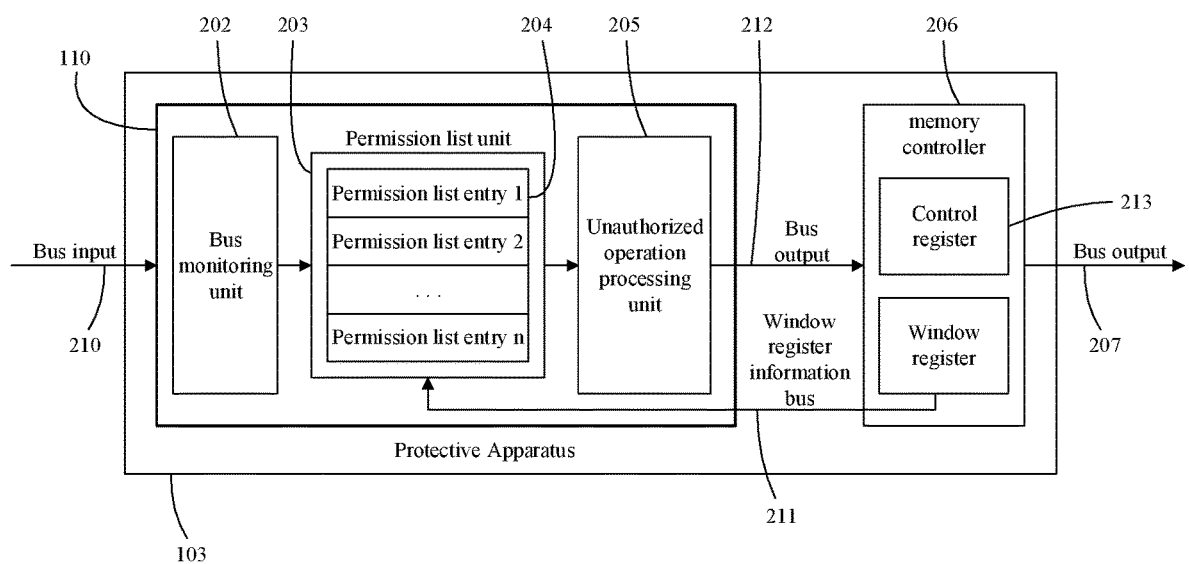
FIG. 2 is an exemplary diagram of components of the protective apparatus and a connection relationship with a memory controller, according to some embodiments of the present disclosure.

FIG. 2 is a diagram of components of the protective apparatus and a connection relationship with a memory controller, according to some embodiments. Referring to FIG. 2, protective apparatus 110 comprises a bus monitoring unit 202, a permission list unit 203, a window register information bus 211, and an unauthorized operation processing unit 205.

Bus monitoring unit 202 is configured to monitor a memory access request having a bus address, to perform permission authentication if a controlling operation on operation register 213 is detected, and to configure a permission list entry 204 if a permission list configuring operation is detected.

Permission list unit 203 is configured to partition a memory space into several virtual memory protection areas and independently set an access permission for each memory area.

Unauthorized operation processing unit 205 is configured to process a subsequent operation after a permission violating access occurs.

Window register information bus 211 is configured to transmit window register information, e.g., transmit window register information in the memory controller 206 to protective apparatus 110. The window register information includes a read window address, a write window address, and an erase window address, and multiple window addresses can correspond to the same bus window register.

In some embodiments, the window register information bus 211 is connected to a window register 208 in a memory controller 206, and multiple window addresses can correspond to the same bus.

In some embodiments, after detecting a permission list configuring operation, bus monitoring unit 202 transmits a bus value to a corresponding permission list in permission list unit 203 and configures a security address range and attribute.

In some embodiments, after bus monitoring unit 213 detects a controlling operation on operation register 213, permission list unit 203 receives a corresponding window address information value as an address to a permission list entry 204 for authentication. For example, in some embodiments, operation register 213 has a memory location at 0x00100000. When bus 104 makes a memory access request to do a read/write/erase on address 0x00100000, bus 104 is performing a controlling operation on operation register 213, and the controlling operation can be detected by bus monitoring unit 213.

Figure 3:
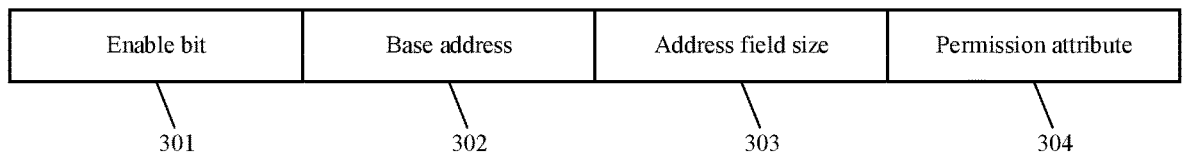
FIG. 3 is a schematic diagram of exemplary content of an permission list entry, according to some embodiments of the present disclosure.

In some embodiments, the permission list includes one or more list entries 204, and each list entry 204 can include content as shown in FIG. 3, which is a schematic diagram of exemplary content of a permission list entry, according to some embodiments of the present disclosure. As shown in FIG. 3, the content can include a list entry enable bit 301, a base address 302, an address field size 303, and a permission attribute 304. List entry enable bit 301 indicates whether the list entry is valid. Base address 302 and address field size 303 can represent an address range protected by list entry 204. Permission attribute 304 represents a permission of the address field, for example, whether it is readable, writable, or erasable.

Referring back to FIG. 2, if a memory access request violates an access permission, unauthorized operation processing unit 205 can perform one, two, or all of the following processing: (1) returning a bus error; (2) sending out an indicator signal; and (3) invalidating the memory access request without performing other processing.

In some embodiments, protective apparatus 110 further includes a global enable register configured to represent that the protective apparatus 110 enables the protection function.

In some embodiments, protective apparatus 110 is located in an indirect access memory controller 103. Further, in some embodiments, configurations of protective apparatus 110 may be enabled only by an access in a privileged state. A privileged state is indicated by a permission indicator input bit on a memory access request, and protective apparatus 110 can be enabled and configured only when the input bit is valid. Configuration operations include configuring an address range for each list entry and configuring a permission attribute register.

In some embodiments, protective apparatus is added into a conventional indirect access memory controller to upgrade the indirect access memory controller. Conventional indirect access memory controllers have the following characteristics: a memory access cannot directly provide a memory address through an input address; instead, an access address is written into window registers within a memory controller first, and then corresponding operation registers (e.g., read registers, write registers, erase registers, etc.) within the memory controller are configured in order to trigger a memory access. When protective apparatus 110 is added into the conventional indirect access memory controller, information written into the window registers is outputted to protective apparatus 110 via window register information bus 211. Information written into the window registers can include read window address information, write window address information, erase window address information, etc.

In some embodiments, bus monitoring unit 202 monitors control operations on operation registers 213 (e.g., read register, write register, erase register, etc.) within memory controller 206. For example, to perform a read operation, a read address is first written into a read window register, and a read operation register within memory controller 206 is written into through a control operation in order to trigger a read operation. Therefore, when bus monitoring unit 202 detects a control operation on operation registers 213, bus monitoring unit 202 would detect that the read operation register has been written into, and an address in the corresponding read window register is transmitted via window register information bus 211 to permission list unit 203 for authentication, and permission list unit 203 decides whether the current read operation is unauthorized.

For example, permission list unit 203 is configured to partition a memory space into several virtual memory protection areas and independently save the size and an access permission attribute of each memory area. Permission list unit 203 can be configured based on information received from bus monitoring unit 202. The content of each permission list entry is as shown in FIG. 3, wherein enable bit 301 represents whether the list entry is valid; base address 302 and address field size 303 represent the location and size of a protection field of the list entry; and permission attribute 304 records an access permission attribute of the field, specific permission attributes including whether the field is readable, writable or erasable. Upon detecting a memory reading request, bus monitoring unit 202 performs a query in permission list unit 203 by using an address on a corresponding window register information bus 211. After a corresponding list entry is found at permission list unit 203, it is checked whether the request meets the access permission. If the request meets the access permission, the request passes and the access is granted. On the other hand, if the request does not meet the access permission, the request is handed over to unauthorized operation processing unit 205.

In some embodiments, when detecting an unauthorized access, the unauthorized operation processing unit 205 returns an error response to the bus and does not transmit the current unauthorized access request to memory controller 206. Other methods can also be used in a similar device. For example, an indicator signal is sent out, which is similar to an interruption, to inform the system that an unauthorized access occurs; or the request is invalidated without further processing.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Specific implementations of the present disclosure are described above, but the protective scope of the present disclosure is not limited to the specific embodiment. Any modification, equivalent replacement and improvement made without departing from the spirit and principle of the present disclosure should fall within the protection scope of the present disclosure.

The invention claimed is:

1. An apparatus for adding a protection function for an indirect access memory controller, comprising:
   a bus monitoring unit including circuitry configured to monitor a memory access request having a bus address and to perform permission authentication if a controlling operation on an operation register of the indirect access memory controller is detected;
   a permission list unit including circuitry configured to receive the bus address from the bus monitoring unit, to evaluate the bus address according to a permission list, and to determine from the permission list a permission attribute that corresponds to the bus address; and
   a window register information bus configured to provide window register information from a memory controller to the permission list unit for controlling permission attributes provided in the permission list,
   wherein the permission list comprises one or more list entries having the following content: a list entry enable bit, a base address, an address field size, and a permission attribute;
   the list entry enable bit indicates whether the list entry is valid; the base address and the address field size represent an address range protected by the list entry; and the permission attribute represents a permission of the address field.

2. The apparatus of claim 1, further comprising an unauthorized operation processing unit including circuitry configured to process an operation performed when the bus address does not correspond with the permission attribute.

3. The apparatus of claim 2, wherein the unauthorized operation processing unit includes circuitry configured to, in response to a memory access request having the bus address violating an access permission, return a bus error, send an indicator signal, or invalidate the request without performing other processing.

4. The apparatus according to claim 1, wherein the window register information comprises a read window address, a write window address, or an erase window address.

5. The apparatus according to claim 1, wherein the permission list unit includes circuitry configured to partition a memory space into several virtual memory protection areas and to set an access permission attribute for each memory area.

6. The apparatus according to claim 1, wherein the memory access request includes a permission indicator input bit that enables or configures the protective apparatus.

7. The apparatus according to claim 1, wherein the bus monitoring unit further includes circuitry configured to update the list entry of the permission list unit if a permission list configuring operation is detected.

8. The apparatus of claim 7, wherein the bus monitoring unit includes circuitry configured to, after detecting the permission list configuring operation, transmit a bus value to a corresponding permission list in the permission list unit.

9. The apparatus according to claim 1, wherein the apparatus includes circuitry configured to, after the bus monitoring unit detects a controlling operation on the operation register, input a window address information value as an address to a permission list entry for authentication.

10. The apparatus according to claim 1, further comprising a global enable register including circuitry configured to represent an enablement of the protection function.

11. An apparatus for adding a protection function for an indirect access memory controller, comprising:
    a bus monitoring unit including circuitry configured to monitor a memory access request having a bus address and to perform permission authentication if a controlling operation on an operation register of the indirect access memory controller is detected;
    a permission list unit including circuitry configured to receive the bus address from the bus monitoring unit, to evaluate the bus address according to a permission list, and to determine from the permission list a permission attribute that corresponds to the bus address; and
    a window register information bus configured to provide window register information from a memory controller to the permission list unit for controlling permission attributes provided in the permission list,
    wherein the bus monitoring unit further includes circuitry configured to update the list entry of the permission list unit if a permission list configuring operation is detected, and to, after detecting the permission list configuring operation, transmit a bus value to a corresponding permission list in the permission list unit, and
    wherein the bus value is a security address range or a permission attribute.

* * * * *